United States Patent
Otsubo et al.

(10) Patent No.: US 9,777,130 B2
(45) Date of Patent: Oct. 3, 2017

(54) POLYPHENYLENE SULFIDE MICROPARTICLES

(71) Applicant: Toray Industries, Inc., Tokyo (JP)

(72) Inventors: Takahiko Otsubo, Nagoya (JP); Itaru Asano, Nagoya (JP); Yoko Wakahara, Otsu (JP); Hiroshi Takezaki, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/105,686

(22) PCT Filed: Dec. 17, 2014

(86) PCT No.: PCT/JP2014/083423
§ 371 (c)(1),
(2) Date: Jun. 17, 2016

(87) PCT Pub. No.: WO2015/098654
PCT Pub. Date: Jul. 2, 2015

(65) Prior Publication Data
US 2016/0311995 A1    Oct. 27, 2016

(30) Foreign Application Priority Data

Dec. 25, 2013  (JP) .................................. 2013-267094
Jun. 30, 2014  (JP) .................................. 2014-134154

(51) Int. Cl.
*C08G 75/00*      (2006.01)
*C08J 9/16*       (2006.01)
(Continued)

(52) U.S. Cl.
CPC . *C08J 9/16* (2013.01); *C08J 3/11* (2013.01); *C08J 3/16* (2013.01); *C08J 9/28* (2013.01);
(Continued)

(58) Field of Classification Search
CPC .. C08G 75/025; C08G 75/14; C08G 75/0263; C08G 75/0268; C08G 75/0259;
(Continued)

(56) References Cited

U.S. PATENT DOCUMENTS 5,278,261 A * 1/1994 Wright ............... C08G 75/0209
427/385.5
5,475,081 A    12/1995 Imai et al.
(Continued)

FOREIGN PATENT DOCUMENTS

CN    101981091      2/2011
JP    61-287927 A    12/1986
(Continued)

OTHER PUBLICATIONS

Supplementary European Search Report dated Apr. 5, 2017, of corresponding European Application No. 14875637.2.
(Continued)

*Primary Examiner* — Shane Fang
(74) *Attorney, Agent, or Firm* — DLA Piper LLP (US)

(57) ABSTRACT

Polyphenylene sulfide microparticles have a linseed oil absorption amount of 40 to 1,000 mL/100 g and a number average particle diameter of 1 to 200 μm. The porous PPS microparticles have a large specific surface area and therefore promote fusion of particles when molded into various molded bodies by applying thermal energy, thus enabling formation or molding of a coating layer of particles at a lower temperature in a shorter time. The porous PPS microparticles have a porous shape and therefore enable scattering light in multiple directions and suppression of specific reflection of reflected light in a specific direction, thus making it possible to impart shading effect and matte effect when added to a medium.

5 Claims, 1 Drawing Sheet

10 μm (51) Int. Cl.
*C08J 3/11* (2006.01)
*C08J 3/16* (2006.01)
*C08J 9/28* (2006.01)

(52) U.S. Cl.
CPC .. *C08J 2201/0544* (2013.01); *C08J 2205/044* (2013.01); *C08J 2205/05* (2013.01); *C08J 2371/02* (2013.01); *C08J 2381/04* (2013.01); *C08J 2381/06* (2013.01); *C08J 2481/06* (2013.01)

(58) Field of Classification Search
CPC ..... C08G 75/0281; B29B 13/00; C08F 6/008; C08F 6/28; B30B 9/28
See application file for complete search history.

(56) References Cited

U.S. PATENT DOCUMENTS

| | | | |
|---|---|---|---|
| 2007/0299219 A1* | 12/2007 | Higashioji | B32B 27/28 525/535 |
| 2011/0020647 A1 | 1/2011 | Makita et al. | |
| 2012/0328880 A1* | 12/2012 | Asano | A61K 9/5089 428/402 |
| 2013/0065054 A1 | 3/2013 | Ichinose et al. | |
| 2013/0289175 A1 | 10/2013 | Liu | |

FOREIGN PATENT DOCUMENTS

| | | |
|---|---|---|
| JP | 02-163126 A | 6/1990 |
| JP | 10-273594 A | 10/1998 |
| JP | 2007-154166 | 6/2007 |
| JP | 2010-106232 A | 5/2010 |
| JP | 2014-24957 | 2/2014 |
| JP | 2014-43522 | 3/2014 |
| JP | 2015-110756 | 6/2015 |
| WO | 2012/043509 A1 | 4/2012 |

OTHER PUBLICATIONS

The First Office Action dated Mar. 29, 2017, of corresponding Chinese Application No. 201480065517.7, along with an English translation.

* cited by examiner

10 μm

POLYPHENYLENE SULFIDE MICROPARTICLES

TECHNICAL FIELD

This disclosure relates to porous polyphenylene sulfide microparticles.

BACKGROUND

Polymer microparticles having a high specific surface area and a spherical shape have been used as additives for molding various polymers, and modifying/improving materials. Specific applications include coating molding composed of formation of a coating film of polymer microparticles; use for various moldings of films, sheets and the like; and use of modifying agents of cosmetics, additives for toner, additives for paints, additives for molded products, light diffusing agents of film and the like.

There has been known a technique in which, in coating molding and various moldings by polymer microparticles, polymer microparticles are arranged or a powder layer is formed, and then polymer microparticles are fused with each other by applying thermal energy to thereby mold the polymer into a desired form. In those applications, fusion of particles is promoted if polymer microparticles have a large specific surface area, thus enabling coating and molding at a lower temperature in a shorter time.

The technique to increase the specific surface area of polymer microparticles includes a technique of making particles porous. In porous polymer microparticles in which a surface of particles is in a porous form, thermal energy applied to a surface of polymer microparticle per unit time increases when thermal energy is applied to polymer microparticles to make a molded body, thus making it possible to obtain molded objects at smaller energy in a shorter time.

The technique to increase a specific surface area of polymer microparticles also includes a technique of decreasing a particle diameter of particles, and a technique of deforming particles. However, the technique of decreasing a particle diameter of particles is not practically preferable since it may cause deterioration of powder handleability and exert an adverse influence on the work environment. The technique of deforming particles is not practically preferable since it may cause unevenness in a molten state due to non-uniform application manner of thermal energy.

Polymer microparticles are added to paint, and also used as additives to change the appearance and texture of paint. For example, polymer microparticles are added as a matting agent of paint.

In that case, light scattering properties of polymer microparticles are utilized. Particles having high shading effect, which is capable of scattering light in multiple directions, imparts high matte effect of paint. The form suitable for imparting high matte effect of polymer microparticles is preferably a porous shape.

Inorganic particles such as silica particles are known as additives for paint. Inorganic particles are not practically preferable since inorganic particles are likely to undergo gravity settling as compared with polymer microparticles, leading to separation from paint.

A polyphenylene sulfide (hereinafter sometimes abbreviated to PPS) resin has properties suitable for use as engineering plastics such as excellent heat resistance, chemical resistance, solvent resistance, and electrical insulation properties, and is therefore used mainly in injection molding applications and extrusion molding applications, for example, various electric components, mechanical components, and automobile components; and additives for modifying agents such as oil and grease of various sliding portions.

There is a high demand in the fact that such excellent PPS resin is formed into microparticles in a porous state and the thus obtained microparticles are used for various moldings, or used as coating agents, heat-resistant additives, and modifying agents or additives of paint. However, it is significantly difficult to form the PPS resin into porous microparticles because of the below-mentioned technical restriction.

Some techniques mentioned below have been proposed as a method of obtaining PPS microparticles. In Japanese Unexamined Patent Publication (Kokai) No. 10-273594, PPS and a thermoplastic polymer other than that are melt-kneaded to form a resin composition having a sea-island structure composed of PPS as an island component and the other thermoplastic polymer as a sea component, and then the sea component is dissolved and washed to obtain spherical PPS resin microparticles. Otherwise, a method of producing PPS microparticles utilizing precipitation by cooling is known. In Japanese Unexamined Patent Publication (Kokai) No. 61-287927, a reaction vessel is cooled after polymerization of a PPS resin to take out PPS as a powder. In Japanese Unexamined Patent Publication (Kokai) No. 2010-106232, a solution prepared by dissolving a PPS resin is put in a heated/pressurized state, and the solution is jetted into a solvent through a nozzle and then quickly cooled to precipitate PPS microparticles.

However, we found that, according to the method disclosed in aforementioned JP '594, the PPS resin and the other thermoplastic resin are melt-kneaded to form the sea-island structure, thus forming islands serving as the origin of PPS microparticles so that only PPS microparticles having a smooth surface can be produced due to the operation of the surface tension. In the precipitation method disclosed in JP '927, PPS powders are fused with each other in the precipitation step and it is difficult to prevent deformation of the PPS powder and widening of the particle diameter distribution. Also in the method disclosed in JP '232, droplets formed by operation of the surface tension are cooled to precipitate in the jetting step so that only PPS microparticles having a smooth surface can be produced.

Meanwhile, porous PPS microparticles are expected to exhibit satisfactory operability in molding applications or to exhibit matte effect as paint additives. To meet the expectation, porous PPS microparticles, which are true sphere-like particle shape and have uniform particle diameter, are desired. However, known PPS microparticles did not satisfy those properties.

It could therefore be helpful to provide porous polyphenylene sulfide microparticles in a practically applicable level.

SUMMARY

We thus provide polyphenylene sulfide microparticles characterized in that a linseed oil absorption amount is in a range of 40 to 1,000 mL/100 g and a number average particle diameter is in a range of 1 to 200 μm.

We also provide a dispersion including the above polyphenylene sulfide microparticles.

We further provide a method of producing polyphenylene sulfide microparticles, which includes, in a system where a polyphenylene sulfide resin (A), a polymer (B) which is different from the polyphenylene sulfide resin, and an organic solvent (C) are mixed and dissolved to cause phase separation into two phases of a solution phase containing the polyphenylene sulfide resin (A) as a main component and a solution phase containing the polymer (B) as a main component, the steps of mixing and dissolving the polyphenylene sulfide resin (A), the polymer (B), and the organic solvent (C) at a temperature Td (° C.); applying a shear force to the thus obtained solution to form an emulsion; and bringing a poor solvent of the polyphenylene sulfide resin (A) into contact with the emulsion at a temperature Tp (° C.) to precipitate the polyphenylene sulfide resin (A), wherein the temperature Tp (° C.) is at least 10° C. lower than the temperature Td (° C.).

It is possible to obtain porous PPS microparticles in a practically applicable level, which has heretofore been difficult to produce. Our porous PPS microparticles have a large specific surface area and therefore promote fusion of particles when molded into various molded bodies by applying thermal energy, thus enabling formation or molding of a coating layer of particles at a lower temperature in a shorter time. Our porous PPS microparticles have a porous shape and therefore enable scattering light in multiple directions and suppression of specific reflection of reflected light in a specific direction, thus making it possible to impart shading effect and matte effect when added to a medium.

DETAILED DESCRIPTION

Figure 1:
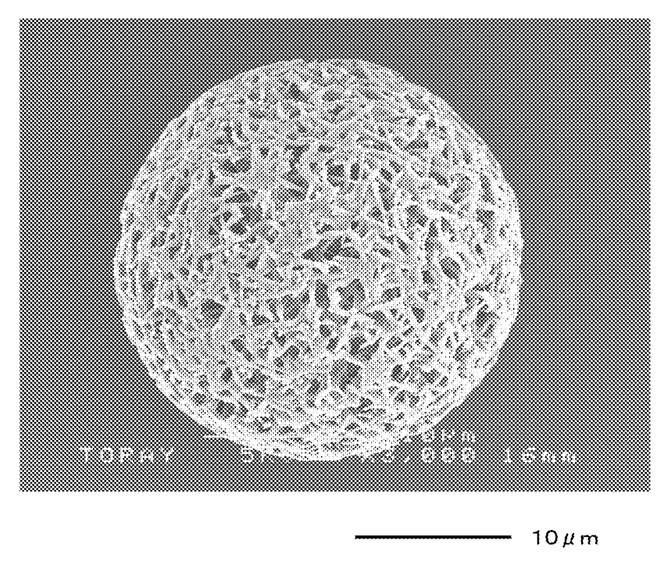
The FIGURE is a scanning electron microscope image (magnification of 3,000) of porous PPS microparticles obtained in Example 1.

Our microparticles will be described in detail below.

Polyphenylene sulfide is a homopolymer or copolymer including a repeating unit represented by Formula (1) as a main structural unit:

(1)

Ar in Formula (1) is an aromatic group. Examples of Ar include aromatic groups represented by Formulae (2) to (4). $R^1$ and $R^2$ each independently represents a substituent selected from hydrogen, an alkyl group, an alkoxyl group, and a halogen group.

(2)

(3)

(4)

As long as the above repeating unit is included as a main structural unit, it is possible to include a branch linkage or cross linkage represented by Formula (5):

(5)

and copolymerization components represented by Formulae (6) to (14). $R^1$ and $R^2$ each independently represents a substituent selected from hydrogen, an alkyl group, an alkoxyl group, and a halogen group.

(6)

(7)

(8)

(9)

(10)

(11)

(12)

(13)

(14)

It is a copolymer of a p-phenylene sulfide unit represented by Formula (15) as a main structural unit of a polymer, and a m-phenylene sulfide unit and/or an o-phenylene sulfide unit, which is particularly preferably used as PPS.

(15)

A copolymerization ratio of the p-phenylene sulfide unit, and the m-phenylene sulfide unit and/or the o-phenylene sulfide unit exerts a significant influence on a melting point (Tm) of a PPS resin. The melting point of the PPS resin exerts an influence on porosity of PPS microparticles. Furthermore, the melting point of the PPS resin exerts an influence on sphericity and particle diameter distribution of PPS microparticles. Therefore, it is preferred to adjust the copolymerization ratio in the below-mentioned range. Too low melting point of the PPS resin leads to a decrease in porosity of PPS microparticles and imparting of the amorphous shape to PPS microparticles, and thus it is not easy to obtain PPS microparticles having stable porosity. Too low melting point of the PPS resin leads to deterioration of sphericity of PPS microparticles, thus widening particle diameter distribution. Too high melting point of the PPS resin also leads to deterioration of sphericity of PPS microparticles, thus widening particle diameter distribution.

A PPS resin used as a raw material to produce PPS microparticles (hereinafter referred to as a raw PPS resin) preferably has a melting point of 210° C. to 270° C., more preferably 220° C. to 260° C., and particularly preferably 230° C. to 250° C.

When the melting point of the raw PPS resin is adjusted in the above range, the thus obtained PPS microparticles easily takes a porous form and exhibit a particle diameter with satisfactory powder handleability. Furthermore, when the melting point of the raw PPS resin is adjusted in the above range, the thus obtained PPS microparticles exhibit high sphericity and narrow particle diameter distribution.

The melting point of the PPS resin as used herein means a top temperature of a peak showing a fusion heat capacity when measured by differential scanning calorimetry (DSC) after raising the temperature to 300° C. under the condition of a temperature rise rate of 20° C./minute, lowering the temperature to 20° C. at a temperature fall rate of 20° C./minute, and raising the temperature again under the condition of a temperature rise rate of 20° C./minute.

To obtain such PPS copolymer, regarding a copolymerization ratio between the p-phenylene sulfide unit, and the m-phenylene sulfide unit and/or the o-phenylene sulfide unit, the m-phenylene sulfide unit and/or the o-phenylene sulfide unit is/are preferably included in the proportion of 1 to 50% by mass, more preferably 2 to 40% by mass, and particularly preferably 3 to 30% by mass, based on total phenylene sulfide units.

When the copolymerization ratio between the p-phenylene sulfide unit, and the m-phenylene sulfide unit and/or the o-phenylene sulfide unit is adjusted in the above range, the thus obtained porous PPS particles preferably have a melting point of 210° C. to 270° C., more preferably 220° C. to 260° C., and particularly preferably 230° C. to 250° C.

It is possible to use, as such PPS resin, those synthesized from a dihalogen aromatic compound and an alkyl metal sulfide in an N-alkylamide solvent by a method which is usually used.

It is difficult to directly measure the porosity of PPS microparticles. However, it is possible to use, as an indirect indicator, a gas adsorption amount per unit weight determined by BET, and a linseed oil absorption amount (Refined linseed oil method: the Japanese Industrial Standards (JIS) K5101-13-1:2004) as Test method for pigments defined in the Japanese Industrial Standards.

A specific surface area method by BET strongly depends on an average particle diameter so that it is more suitable to use the linseed oil absorption amount as the indicator for an industrial material.

In our PPS microparticles, the linseed oil absorption amount is 40 to 1,000 mL/100 g. The lower limit is preferably 45 ml/100 g or more, more preferably 50 ml/100 g or more and, still more preferably 55 ml/100 g or more, particularly preferably 80 ml/100 g or more, and extremely preferably 100 ml/100 g or more.

The upper limit of the linseed oil absorption amount is preferably 800 ml/100 g or less, more preferably 700 ml/100 g or less, still more preferably 600 ml/100 g or less, particularly preferably 500 ml/100 g or less, and extremely preferably 400 ml/100 g or less.

If the linseed oil absorption amount is less than 40 mL/100 g, a large improving effect of moldability during molding cannot be achieved. If the linseed oil absorption amount is more than 1,000 mL/100 g, microparticles become bulky and, at the same time, the viscosity of a coating solution increases when using microparticles for coating molding, leading to poor handleability.

A number average particle diameter of a particle diameter measured from an image observed by a scanning electron microscope is of 1 to 200 μm. The upper limit of the number average particle diameter is preferably 180 μm or less, more preferably 150 μm or less, still more preferably 125 μm or less, particularly preferably 100 μm or less, extremely preferably 75 μm or less, and most preferably 50 μm or less. The lower limit of the number average particle diameter is preferably more than 1 μm more preferably 3 μm or more, still more preferably 5 μm or more, particularly preferably 8 μm or more, and extremely preferably 10 μm or more.

If number average particle diameter is less than 1 μm microparticles are scattered during handling to cause deterioration of work environment. It also causes difficulty in controlling the thickness of a molded body during molding, for example, it becomes difficult to increase a wall thickness. If the number average particle diameter is more than 200 μm a specific surface area of microparticles decreases so that not only the molding time is prolonged but also dispersion stability deteriorates when using microparticles as a coating solution, leading to remarkable settling of microparticles.

The particle diameter of PPS microparticles is measured in the following manner. Using a scanning electron microscope (for example, scanning electron microscope JSM-6301NF, manufactured by JEOL Ltd.), PPS microparticles is observed by a magnification of 100 to 500 times, and then each diameter (particle diameter) of 100 PPS microparticles is measured. Subsequently, regarding each particle diameter of 100 particles, the number average particle diameter is calculated by determining an arithmetical average by the following equation. If particles have not a true sphere-like particle shape on an image (for example, particles have an oval shape, or particles irregularly gather to form a coagulated body), the longest diameter is measured as the particle diameter.

$$D_n = \left(\sum_{i=1}^{n} R_i\right) / n$$

where Ri represents a particle diameter of each particle, n represents the number of measurements (100), and Dn represents a number average particle diameter.

Sphericity of porous PPS microparticles is preferably 80 or more, more preferably 85 or more, particularly preferably 90 or more, and most preferably 98 or more. If microparticle have high sphericity, not only PPS microparticles are excellent in fluidity and adhesion, but also when thermal energy is applied during molding, heat is uniformly transferred to microparticles and microparticles can be uniformly dissolved in an efficient manner so that a molding operation can be more simplified.

Sphericity of porous PPS microparticles is an arithmetical average of sphericity of randomly selected 30 particles using a scanning electron microscope, and calculated in accordance with the equation shown below. Sphericity of each particle is a ratio between a long diameter and a short diameter, which cross at right angles, of each particle, and calculated in accordance with the following equations:

$$S_m = \left(\sum_{i=1}^{n} S_i\right) / n$$

$$S_i = (a_i / b_i) * 100$$

where Sm represents an average sphericity (%), Si represents a sphericity of each particle, ai represents a short diameter of each particle, bi represents a long diameter of each particle, and n represents the number of measurements (30).

A particle diameter distribution index, which is an indicator showing particle diameter distribution of porous PPS microparticles, is preferably 1 to 3, more preferably 1 to 2.5, still more preferably 1 to 2.0, yet more preferably 1 to 1.75, and particularly preferably 1 to 1.5. The lower limit of the particle diameter distribution index is 1 in theory. If microparticles exhibit a small particle diameter distribution index, the particle diameter is more uniform and a difference in dissolution rate or melting rate between particles is hardly obtained. Therefore, it becomes possible to mold by dissolving or melting particles more uniformly, thus enabling molding with less unevenness and smooth surface. Accordingly, it is advantageous in molding.

The particle diameter distribution index of porous PPS microparticles is calculated by the following equations using the measurement results of the particle diameter when the number average particle diameter was calculated.

$$D_n = \left(\sum_{i=1}^{n} R_i\right) / n$$

$$D_v = \sum_{i=1}^{n} R_i^4 / \sum_{i=1}^{n} R_i^3$$

$$PDI = D_v / D_n$$

where Ri represents a particle diameter of each particle, n represents the number of measurements (100), Dn represents a number average particle diameter, Dv represents a volume average particle diameter, and PDI represents a particle diameter distribution index.

Our PPS microparticles can be dispersed in a desired dispersion medium to form a dispersion. Examples of the dispersion medium include, but are not limited to, aliphatic hydrocarbon-based solvents, aromatic hydrocarbon-based solvents, ester-based solvents, halogen-based solvents, ketone-based solvents, alcohol-based solvents, aprotic polar solvents, carboxylic acid solvents, ether-based solvents, ionic liquids, water and the like.

The following solvents are specifically exemplified as these dispersion media. Examples of aliphatic hydrocarbon-based solvents include pentane, hexane, heptane, octane, nonane, n-decane, n-dodecane, n-tridecane, tetradecane, cyclohexane, and cyclopentane. Examples of aromatic hydrocarbon-based solvents include benzene, toluene, xylene, and 2-methylnaph-thalene. Examples of ester-based solvents include ethyl acetate, methyl acetate, butyl acetate, butyl propionate, and butyl butyrate. Examples of halogenated hydrocarbon-based solvents include chloroform, bromoform, methylene chloride, carbon tetrachloride, 1,2-dichloroethane, 1,1,1-trichloroethane, chlorobenzene, 2,6-dichlorotoluene, hexafluoroisopropanol and the like. Examples of ketone-based solvents include acetone, methyl ethyl ketone, methyl isobutyl ketone, methyl butyl ketone and the like. Examples of alcohol-based solvents include methanol, ethanol, 1-propanol, 2-propanol and the like. Examples of aprotic polar solvents include N-methyl-2-pyrrolidone (NMP), dimethyl sulfoxide (DMSO), N,N-dimethylformamide (DMF), N,N-dimethylacetamide (DMA), propylene carbonate, trimethylphosphoric acid, 1,3-dimethyl-2-imidazolidinone, sulfolane and the like. Examples of carboxylic acid solvents include formic acid, acetic acid, propionic acid, butyric acid, lactic acid and the like. Examples of ether-based solvents include anisole, diethylether, tetrahydrofuran, diisopropylether, dioxane, diglyme, dimethoxyethane and the like. Examples of ionic liquids include 1-butyl-3-methylimidazolium acetate, 1-butyl-3-methylimidazolium hydrogen sulfate, 1-ethyl-3-imidazolium acetate, 1-ethyl-3-methylimidazolium thiocyanate and the like.

From the viewpoint of both satisfactory dispersibility attributable to affinity of PPS microparticles and industrial easiness for handling, of these, the dispersion medium is preferably a dispersion medium selected from aromatic hydrocarbon-based solvents, alcohol-based solvents, ketone-based solvents, and water, more preferably a dispersion medium selected from alcohol-based solvents, ketone-based solvents, and water, and more preferably a dispersion medium selected from alcohol-based solvents and water. Specific examples of preferred dispersion medium include dispersion media selected from toluene, methyl ethyl ketone, ethanol, isopropanol, and water. Plural type of these dispersion media may be used as a mixture.

When used for coating molding as a coating solution, a dispersion of PPS microparticles is capable of forming a coating layer at a lower temperature in a short time because of satisfactory moldability exhibited by a specific form of a PPS microparticle.

Examples of the method of producing porous PPS microparticles include a quench method in which a PPS resin is granulated by slow cooling after polymerization, a flash method in which a solvent is quickly scattered after polymerization to precipitate a resin, a mechanical pulverization method using a ball mill, a beads mill, a jet mill, a mortar and the like, a forcible melt kneading method, a spray drying method, or a precipitation method by cooling. Of these, the below-mentioned method utilizing a phase separation phenomenon of a polymer solution is most preferable.

The method utilizing a phase separation phenomenon of a polymer solution is a method in which, in a system where a PPS resin (A), a polymer (B) different from the PPS resin, and an organic solvent (C) are dissolved and mixed to cause phase separation into two phases of a solution phase containing the PPS resin (A) as a main component and a solution phase containing the polymer (B) as a main component, PPS microparticles are precipitated by forming an emulsion in which the solution phase containing the PPS resin (A) as a main component serves as a dispersion phase, and the solution phase containing the polymer (B) as a main component serves as a continuous phase, and then bringing a poor solvent of the PPS resin into contact with the emulsion. The solution phase containing the PPS resin (A) as a main component (hereinafter referred to as a PPS resin solution phase) is a solution phase in which a large amount of the PPS resin is distributed as compared with the polymer (B) among the PPS resin and the polymer (B). The solution phase containing the polymer (B) as a main component (hereinafter referred to as a polymer (B) solution phase) is a solution phase in which a large amount of the polymer (B) is distributed as compared with the PPS resin.

The "system where a PPS resin (A), a polymer (B) different from the PPS resin, and an organic solvent (C) are dissolved and mixed to cause phase separation into two phases of a solution phase containing the PPS resin (A) as a main component and a solution phase containing the polymer (B) as a main component" means a system where the PPS resin (A), the polymer (B), and the organic solvent (C) are mixed to cause separation into two phases of a PPS resin solution phase and a polymer (B) solution phase.

Examples of the polymer (B) include a thermoplastic resin or a thermosetting resin, among polymers different from the PPS resin, and the thermoplastic resin is preferable from the viewpoint of easiness of dissolution in the organic solvent (C). Specific examples thereof include polyethylene oxide, polyethylene glycol, polyvinyl alcohol (which may be a fully saponified type or a partially saponified type polyvinyl alcohol), hydroxypropyl cellulose and the like. Since the thus obtained PPS particles exhibits narrow particle diameter distribution, the resin is preferably a resin selected from polyethylene oxide, polyethylene glycol, and polyvinyl alcohol (which may be a fully saponified type or partially saponified type polyvinyl alcohol).

Regarding the molecular weight of the polymer (B), those having a weight average molecular weight of 1,000 or more are preferably used. When using such polymer (B), it is easy to induce phase separation into two phases of a solution phase containing the PPS resin as a main component and a solution phase containing the polymer (B) as a main component so that it is easy to obtain porous PPS microparticles having sphericity of 80 or more. The molecular weight of the polymer (B) is preferably 1,000 to 10,000,000 in terms of a weight average molecular weight. The upper limit of the molecular weight is more preferably 5,000,000 or less, still more preferably 2,000,000 or less, and particularly preferably 1,000,000 or less. From the view point of easiness of the occurrence of phase separation, the lower limit of the molecular weight is more preferably 1,000 or more, still more preferably 10,000 or more, and particularly preferably 20,000 or more.

The weight average molecular weight as used herein means a weight average molecular weight expressed in terms of polyethylene glycol, as a reference sample, measured by gel permeation chromatography (GPC) using water as a solvent. Dimethylformamide is used as the solvent when water cannot be used. Tetrahydrofuran is used when the measurement cannot be still performed, and hexafluoroisopropanol is used when the measurement cannot be still performed.

The organic solvent (C) is a solvent that dissolves the PPS resin (A) and the polymer (B). The solvent dissolving the polymer means a solvent capable of dissolving more than 1% by mass of the PPS resin and the polymer (B) in the organic solvent (C) at a temperature at which dissolution is actually carried out, that is, a temperature Td at which the PPS resin (A) and the polymer (B) are dissolved and mixed. It is preferred that the organic solvent (C) is capable of dissolving the PPS resin in a metastable manner at the temperature Tp in the step of bringing into contact with a poor solvent to obtain porous PPS microparticles. The organic solvent (C) of the PPS resin solution phase and the organic solvent (C) of the polymer (B) solution phase may be the same or different. However, it is preferred that both solvents are substantially the same.

Solvents are preferably organic amide-based solvents such as N-methyl-2-pyrrolidone, N,N-dimethylformamide, N,N-dimethylacetamide, and N-methylcaprolactam. Plural types of these solvents may be used in combination or used alone. From the viewpoint of solubility of the PPS resin and dissolution stability at Tp, N-methyl-2-pyrrolidone is more preferable.

The poor solvent of the PPS resin means a solvent in which solubility of the PPS resin in a solvent is 1% by mass or less, more preferably 0.5% by mass or less, and still more preferably 0.1% by mass or less. The poor solvent is preferably a solvent which is a poor solvent of the PPS resin and also dissolves the polymer (B). Whereby, it is possible to efficiently precipitate porous PPS microparticles composed of the PPS resin. It is preferred that the organic solvent (C) is uniformly mixed with the poor solvent.

Specific examples of the poor solvent vary depending on types of the PPS resin and the polymer (B), and include solvents selected from aliphatic hydrocarbon-based solvents such as pentane, hexane, heptane, octane, nonane, n-decane, n-dodecane, n-tridecane, cyclohexane, and cyclopentane; aromatic hydrocarbon-based solvents such as benzene, toluene, and xylene; alcohol-based solvents such as methanol, ethanol, 1-propanol, and 2-propanol; and water. From the viewpoint of efficiently forming PPS into particles in a porous form, the poor solvent is preferably a solvent selected from aromatic hydrocarbon-based solvents, aliphatic hydrocarbon-based solvents, alcohol-based solvents, and water, more preferably a solvent selected from alcohol-based solvents and water, and most preferably water.

To obtain the condition where a phase separation state is easily achieved, a difference in SP value between the PPS resin (A) and the polymer (B) is preferably large. In this case, the difference in SP value is preferably 1 $(J/cm^3)^{1/2}$ or more, more preferably 2 $(J/cm^3)^{1/2}$ or more, still more preferably 3 $(J/cm^3)^{1/2}$ or more, particularly preferably 5

$(J/cm^3)^{1/2}$ or more, and most preferably 8 $(J/cm^3)^{1/2}$ or more. If the SP value is in the above range, it becomes easy to perform phase separation, thus making it possible to obtain PPS microparticles having a higher content of the PPS resin. There is no particular limitation as long as both the PPS resin (A) and the polymer (B) are dissolved in the organic solvent (C). The upper limit of the difference in SP value is preferably 20 $(J/cm^3)^{1/2}$ or less, more preferably 15 $(J/cm^3)^{1/2}$ or less, and still more preferably 10 $(J/cm^3)^{1/2}$ or less.

The SP value as used herein is calculated based on the Fedor's estimation method, and is calculated based on cohesive energy density and the molar molecular volume (hereinafter sometimes referred to as calculation method) ("SP value, Base, Application and Calculation Method," Hideki Yamamoto, published by Johokiko Co., Ltd., Mar. 31, 2005). If the calculation cannot be performed by this method, the SP value is calculated from measurements based on whether or not it is dissolved in a solvent with a known solubility parameter (hereinafter sometimes referred to as a measurement method), and the calculated value is used instead ("Polymer Handbook Fourth Edition," J. Brand, published by Wiley, 1998).

To select the condition where a phase separation state is achieved, appropriate conditions for phase separation can be determined based on a three-component phase diagram made from a simple preliminary test to observe the states when changing the ratio of the three components of the PPS resin (A), the polymer (B), and the organic solvent (C) dissolving them.

To prepare the phase diagram, the PPS resin (A), the polymer (B), and the organic solvent (C) are mixed and dissolved at an arbitrary ratio, and left to stand to determine whether or not an interface is formed. This test is carried out at least at three or more ratios, preferably at five or more ratios, more preferably at ten or more ratios. By determining the range where two phase separation takes place and the range where only one phase forms, the conditions for desired phase separation can be found.

In that case, to judge whether or not a phase-separated state can be formed, the ratio of the PPS resin (A), the polymer (B), and the organic solvent (C) is controlled at an appropriate ratio at the temperature and pressure where our processes are to be carried out. Thereafter, the PPS resin (A) and the polymer (B) are dissolved completely, followed by well stirring and further standing for 3 days, thus observing to determine whether or not phase separation occurs macroscopically. However, when a sufficiently stable emulsion is formed, macroscopic phase separation may not occur even after being left to stand for 3 days. In such a case, the occurrence of phase separation is determined based on microscopic phase separation observation carried out by using an optical microscope or a phase contrast microscope.

Each concentration of the PPS resin (A) and the polymer (B) in the organic solvent (C) is preferably more than 1% by mass based on the total mass of the mixture, more preferably 2% by mass or more, still more preferably 3% by mass or more, and yet more preferably 5% by mass or more. The upper limit of each concentration of the PPS resin (A) and the polymer (B) is preferably 50% by mass or less, more preferably 30% by mass or less, and still more preferably 20% by mass or less, based on the total mass of the mixture, on the assumption that the polymer and the resin are actually dissolve in the organic solvent (C).

The interface tension between two phases of the PPS resin solution phase and the polymer (B) solution phase obtained by phase separation is small because both phases are formed of an organic solvent, and this feature allows the thus formed emulsion to have stability and a very narrow particle diameter distribution so that the thus obtained PPS microparticles exhibit a narrow particle diameter distribution. In particular, this effect is remarkable when the same organic solvent is used as the organic solvent (C) to dissolve both the PPS resin (A) and the polymer (B).

The interface tension between two phases obtained by phase separation is too small to measure directly with the commonly-used hanging-drop method in which a solution is added to another solution to take measurements. The interface tension, however, can be estimated from the surface tension of each phase exposed to air. Thus, assuming $r_1$ and $r_2$ represent the surface tension of each phase exposed to air, the interface tension $r_{1/2}$ is estimated as an absolute value of $r_{1/2}=r_1-r_2$.

In this case, the upper limit of $r_{1/2}$ is preferably 10 mN/m or less, more preferably 5 mN/m or less, still more preferably 3 mN/m or less, and particularly preferably 2 mN/m or less. The lower limit is preferably more than 0 mN/m.

A viscosity ratio of two phases obtained by phase separation exerts an influence on the number average particle diameter and particle diameter distribution of the thus obtained PPS microparticles. The lower limit of the viscosity ratio is preferably 0.1 or more, more preferably 0.2 or more, still more preferably 0.3 or more, yet more preferably 0.5 or more, and extremely preferably 0.8 or more. The upper limit of the viscosity ratio is preferably 10 or less, more preferably 5 or less, still more preferably 3 or less, particularly preferably 1.5 or less, and extremely preferably 1.2 or less. The viscosity ratio of two phases as used herein is defined as a ratio of a viscosity of the PPS resin solution phase to a viscosity of the polymer (B) solution phase under the temperature conditions which are to be actually carried out.

The PPS resin (A), the polymer (B), and the organic solvent (C) are mixed to completely dissolve the PPS resin (A) and the polymer (B). In this case, the temperature is regarded as Td (° C.).

Preferred temperature varies depending on the copolymerization ratio of the PPS resin and types of the organic solvent (C) and therefore Td cannot be uniquely determined, and the temperature is preferably 180° C. or higher, more preferably 200° C. or higher, still more preferably 220° C. or higher, particularly preferably 230° C. or higher, and extremely preferably 240° C. or higher. There is no particular limitation on the upper limit, and the temperature is preferably 300° C. or lower from the viewpoint of industrial possibility.

In such manner, an emulsion is formed by applying a shear force to the thus obtained solution using a system for phase separation.

The temperature of the emulsion formation step is the temperature at which the PPS resin and the polymer (B) are dissolved in the organic solvent (C), or higher. There is no particular limitation on the temperature range, and the temperature is preferably 0° C. to 300° C. from the viewpoint of industrial possibility. The upper limit of the temperature range is adjusted in accordance with the balance with the temperature Td at which the PPS resin is dissolved, and is preferably 290° C. or lower, more preferably 280° C. or lower, still more preferably 270° C. or lower, and particularly preferably 260° C. or lower. Proper temperature varies depending on the copolymerization ratio of the PPS resin and types of the organic solvent (C) and cannot be uniquely determined, and there is no particular limitation as long as the temperature is higher than the temperature at which the PPS resin is precipitated. Specifically, the lower limit of the temperature of the emulsion formation step is preferably 180° C. or higher, more preferably 200° C. or higher, still more preferably 220° C. or higher, particularly preferably 230° C. or higher, and extremely preferably 240° C. or higher.

The pressure of the emulsion formation step is preferably normal pressure to 100 atom (10.1 MPa) from the viewpoint of industrial possibility. Although depending on the saturated vapor pressure of a mixed solvent at Td and Tp, the upper limit of the pressure is preferably 75 atom (7.5 MPa) or less, still more preferably 50 atom (5.0 MPa) or less, and particularly preferably 30 atom (3.0 MPa) or less. The lower limit of the pressure is preferably saturated vapor pressure or more of the solvent at Td and Tp.

The emulsion formation step is preferably performed in an inert gas atmosphere. The inert gas is preferably nitrogen, helium, argon, or carbon dioxide, and more preferably nitrogen or argon.

To obtain a shear force enough to form an emulsion, stirring is performed using a known method, and it is possible to use a liquid phase stirring method using a stirring blade, a stirring method using a continuous twin-screw mixer, a mixing method using a homogenizer, ultrasonic irradiation and the like.

In stirring using a stirring blade, a stirring rate is preferably 50 rpm to 1,200 rpm, more preferably 100 rpm to 1,000 rpm, still more preferably 200 rpm to 800 rpm, and particularly preferably 300 rpm to 600 rpm, although it depends on a shape of the stirring blade.

Examples of the stirring blade include propeller, paddle, flat paddle, turbine, double cone, single cone, single ribbon, double ribbon, screw, and helical ribbon type stirring blades, but are not limited thereto as long as enough shear force can be applied to the system. To perform efficient stirring, baffle plates may be provided in the vessel.

To form an emulsion, stirrers are not necessarily required, and devices such as an emulsifying machine and a dispersion machine may be used. Specific examples thereof include batch-type emulsifying machines such as Homogenizer (manufactured by IKA Corporation), Polytron (registered trademark) (manufactured by Kinematica, Inc.), and T. K. Autohomomixer (manufactured by Tokushu Kika Kogyo Co., Ltd.); Ebara Milder (manufactured by Ebara Corporation)), T. K. Filmics, T. K. Pipeline Homomixer (manufactured by Tokushu Kika Kogyo Co., Ltd.), Colloid Mill (manufactured by Nihonseiki Kaisya Ltd.), Slusher, Trigonal Wet Grinder (manufactured by Nippon Coke & Engineering Co., Ltd.), ultrasonic homogenizer, static mixer and the like.

The emulsion thus obtained is subsequently supplied to the step of precipitating microparticles. The emulsion produced by the above-mentioned step is brought into contact with a poor solvent to precipitate PPS microparticles having a diameter in correspondence with a liquid droplet diameter of the emulsion.

The temperature Tp in the reaction vessel, at which the emulsion is brought into contact with a poor solvent, is preferably at least 10° C. lower than the temperature Td at which the PPS resin (A) is dissolved in the organic solvent (C), and PPS microparticles can be obtained in a porous form by bringing the emulsion into contact with a poor solvent at such temperature.

When the temperature Tp, at which the emulsion is brought into contact with a poor solvent, is controlled to the temperature which is at least 10° C. lower than the temperature Td, the solubility of PPS microparticles decreases and PPS microparticles can be precipitated more rapidly so that precipitation (nucleation) and growth of microparticles can be controlled, thus making it possible to obtain porous PPS microparticles having high sphericity in the form of having narrow particle diameter distribution.

A difference between the temperatures Tp and Td is more preferably 10° C. or higher and 80° C. or lower, still more preferably 10° C. or higher and 70° C. or lower, particularly preferably 20° C. or higher and 60° C. or lower, and most preferably 30° C. or higher and 50° C. or lower. It is preferred to adjust difference between the temperatures Tp and Td in the above range since it is possible to obtain porous PPS microparticles which has higher sphericity in the form with a small particle diameter distribution index.

If the difference between the temperatures Tp and Td increases 80° C. and Tp becomes lower, the PPS resin is not precipitated due to contact with the poor solvent, but is precipitated as a result of a decrease in solubility due to lowering of the temperature. Such PPS microparticles exhibit low porosity and sphericity of the microparticles deteriorates, thus failing to obtain porous PPS particles of a preferred aspect.

The contact between the poor solvent and the emulsion may be achieved by either pouring the emulsion in the poor solvent, or pouring the poor solvent in the emulsion, but it is preferable to pour the poor solvent in the emulsion.

There is no particular limitation on the method of pouring the poor solvent as long as PPS microparticles are obtained, and any of a continuous dropping method, a split addition method, and a batch addition method may be employed. However, the continuous dropping method or the split dropping method is preferably employed because the method can prevent coagulation, fusion, or coalescence of the emulsion from being caused when adding the poor solvent, which may lead to a large particle diameter distribution of the thus obtained PPS microparticles or bulky grains larger than 200 μm and to industrially perform it efficiently, the most preferable method is continuous dropping method.

Further, the time to add the poor solvent is preferably within 5 minutes or more to 50 hours or less, more preferably within 10 minutes or more to 10 hours or less, still more preferably 30 minutes or more to 5 hours or less, and particularly preferably within 1 hour or more to 5 hours or less. If it is carried out within these ranges, coagulation between particles can be inhibited, and PPS microparticles having uniform particle diameter and narrow particle diameter distribution can be obtained. If it is carried out within a shorter time than these ranges, the emulsion will be likely to undergo coagulation, fusion, or coalescence, which may lead to a large particle diameter distribution of the thus obtained PPS microparticles or bulky grain. Further, addition for a longer time than the above-mentioned ranges is not practical in consideration of industrial performance.

The optimum amount of the poor solvent to be added varies because a state of emulsion varies depending on the molecular weight of the polymer (B) and the solubility of the PPS resin (A) in the organic solvent (C), and the amount is preferably 0.1 part by mass to 10 parts by mass based on 1 part by mass of the emulsion. The upper limit is more preferably 5 parts by mass or less, still more preferably 3 parts by mass or less, particularly preferably 2 parts by mass or less, and most preferably 1 part by mass or less. The lower limit is preferably 0.1 part by mass or more, and still more preferably 0.5 part by mass or more.

Although the time of the contact between the poor solvent and the emulsion may be a time sufficient for precipitation of microparticles to cause sufficient precipitation and obtain an efficient productivity, it is preferably 5 minutes or more and 50 hours or less, more preferably 5 minutes or more and 10 hours or less, still more preferably 10 minutes or more and 5 hours or less, particularly preferably 20 minutes or more and 4 hours or less, and most preferably 30 minutes or more and 3 hours or less, after completion of the addition of the poor solvent.

Microparticles can be collected by subjecting the thus obtained dispersion of PPS microparticles to solid-liquid separation using a generally known method such as filtration, filtration under reduced pressure, pressure filtration, centrifugal separation, centrifugal filtration or spray drying.

For refining, the PPS polymer microparticles obtained from the solid-liquid separation are purified by washing them in a solvent or the like as needed to remove impurities that are carried on the surface or contained.

This present method has an advantage that it is possible to recycle and reuse the organic solvent (C) and the polymer (B) separated in the solid-liquid separation step carried out to produce microparticles.

The solvent separated in the solid-liquid separation step is a mixture of the polymer (B), the organic solvent (C), and the poor solvent. Removal of the poor solvent from the solvent enables it to be used again as a solvent to form an emulsion. A known method can be used as the method of removing the poor solvent. Specific examples thereof include simple distillation, distillation under reduced pressure, precision distillation, thin film distillation, extraction, membrane separation and the like. The method is preferably a method by simple distillation, distillation under reduced pressure or precision distillation.

When distillation operation such as simple distillation or distillation under reduced pressure is performed, because, like during production of PPS microparticles, heat is applied to the system, possibly promoting heat decomposition of the polymer (B) and the organic solvent (C), it is preferably performed in an oxygen-free state, more preferably in an inert atmosphere. Specifically, it is preferably carried out under a condition of nitrogen, helium, argon or carbon dioxide. Further, a phenol-based compound may be again added as an antioxidant when the distillation operation is performed.

For recycling, it is preferred that the poor solvent is removed as much as possible. Specifically, in a solvent after removing the poor solvent, the amount of the remaining poor solvent is 10% by mass or less, preferably 5% by mass or less, more preferably 3% by mass or less, and particularly preferably 1% by mass or less, based on the total amount of the organic solvent (C) and the polymer (B) to be recycled. If the remaining amount exceeds this range, because, when the solvent is recycled as a solvent for formation of an emulsion, the particle diameter distribution of porous PPS microparticles becomes broader, or the particles are coagulated, and such a condition is not preferred. The amount of the poor solvent in the solvent to be recycled can be measured by a known method such as gas chromatography or the Karl Fischer's method.

In practice, since loss of the organic solvent (C) or the polymer (B) may take place during the operations of removing the poor solvent, it is preferred to appropriately adjust the composition when the collected solvent is recycled.

The thus obtained PPS microparticles have a surface in a porous form and therefore promote fusion of particles when molded into various molded bodies by applying thermal energy, thus enabling formation or molding of a coating layer of particles at a lower temperature in a shorter time. PPS microparticles also have a porous shape and therefore enable scattering light in multiple directions and reduction of a reflection intensity of light, thus making it possible to impart shading effect and matte effect when added to a medium. In a preferred aspect, porous PPS microparticles have a true sphere-like particle shape and a uniform particle diameter, thus enabling an improvement in handleability of porous PPS microparticles during molding operation, and an improvement in smoothness and suppression of unevenness of the thus obtained molded body. Furthermore, porous PPS microparticles having a true sphere-like particle shape and a uniform particle diameter exert the effect as a matting agent for paint when particles are added to paint without causing deterioration of quality of paint as a result of coagulation or separation of particles in paint.

As mentioned above, our PPS microparticles can be practically employed for various applications. Specifically, our PPS microparticles can be used for molding materials typified by injection molding and fine processing; electric and electronic components and electronic product casing components obtained by the materials; additives such as thickeners and molding dimensional stabilizers during various moldings; coating films and coating materials as forms of dispersions, coating solutions, paints and the like; rapid prototyping, rapid manufacturing, and additive manufacturing materials; fluidity improving agents, lubricants, polishing agents, and thickeners as powders; slippage improving agents for plastic films/sheets, antiblocking agents, gloss adjusting agents, and matte finish agents; various modifying agents for plastic films, sheets, and lens such as light diffusion agents, surface hardness improving agents, and ductility improving materials; various ink compositions; additives for gloss adjusting agents and matte finish agents of toners; additives for various paints such as gloss adjusting agents and matte finish agents; spacers for liquid crystal display; fillers for chromatography; base materials/additives for cosmetics; catalysts/carriers for chemical reactions; and gas adsorbents.

EXAMPLES

Our PPS microparticles will be described by way of Examples, but this disclosure is not limited thereto.

Measurement of Linseed Oil Absorption Amount

In accordance with the method defined in the Japanese Industrial Standards (JIS) K5101-13-1:2004, a linseed oil absorption amount was measured.

Measurement of Number Average Particle Diameter

A particle diameter of porous PPS microparticles is a number average particle diameter. Using a scanning electron microscope (scanning electron microscope JSM-6301NF, manufactured by JEOL Ltd.), PPS microparticles were observed by a magnification of 100 times to 500 times, and each diameter (particle diameter) of 100 PPS microparticles was measured. Subsequently, a number average particle diameter was calculated by determining an arithmetical average of each particle diameter of 100 particles through the equation shown below. When each of particles has not a true sphere-like particle shape on an image (for example, particles have an oval shape, or particles irregularly gather to form a coagulated body), a longest diameter thereof was measured as the particle diameter.

$$D_n = \left(\sum_{i=1}^{n} R_i\right) / n$$

wherein Ri represents a particle diameter of each particle, n represents the number of measurements (100), and Dn represents a number average particle diameter.

Measurement of Sphericity

Sphericity of porous PPS microparticles is an arithmetical average of sphericity of randomly selected 30 particles using a scanning electron microscope and calculated in accordance with the equation shown below. Sphericity of each particle is a ratio between a long diameter and a short diameter, which cross at right angles, of each particle, and calculated in accordance with the following equations.

$$S_m = \left(\sum_{i=1}^{n} S_i\right) / n$$

$$S_i = (a_i / b_i) * 100$$

where Sm represents an average sphericity, Si represents sphericity of each particle, ai represents a short diameter of each particle, bi represents a long diameter of each particle, and n represents the number of measurements (30).

Calculation of Particle Diameter Distribution Index

The particle diameter distribution index of porous PPS microparticles is calculated by the following equations using the measurement results of the particle diameter when the number average particle diameter was calculated.

$$D_n = \left(\sum_{i=1}^{n} R_i\right) / n$$

$$D_v = \sum_{i=1}^{n} R_i^4 / \sum_{i=1}^{n} R_i^3$$

$$PDI = D_v / D_n$$

where Ri represents the particle diameter of each particle, n represents the number of measurements (100), Dn represents the number average particle diameter, Dv represents the volume average particle diameter, and PDI represents the particle diameter distribution index.

Method of Measuring Melting Point

Each melting point of a raw PPS resin and PPS microparticles was measured by calculating a top temperature of a peak showing a fusion heat capacity in the second temperature rise process when measured by differential scanning calorimetry (Differential scanning calorimeter Q20, manufactured by TA Instruments) after raising the temperature to 300° C. under the condition of a temperature rise rate of 20° C./minute, lowering the temperature to 20° C. at a temperature fall rate of 20° C./minute, and raising the temperature again under the condition of a temperature rise rate of 20° C./minute.

Thermogravimetry

Using a thermal gravimetric-differential thermal analyzer (TG-DTA, DTG-60, manufactured by Shimadzu Corporation), the temperature was raised from 20° C. to 500° C. under a temperature rise rate of 10° C./minute, and then a weight reduction amount at 300° C. was measured.

Evaluation of Film Moldability of PPS Microparticles

Porous PPS microparticles (0.3 g) were sandwiched between infusible polyimide films and, after inserting into a hot pressing machine, different samples were pressed at each temperature of 230° C., 250° C., 290° C., and 340° C. for 2 minutes, and then quickly cooled by dipping in water to obtain films. Evaluation criteria of film moldability are as follows:

A: A film having a smooth surface and high transparency could be molded.
B: Although it was possible to mold into a film shape, the thus obtained film exhibits low transparency and unmelted microparticles remained.
C: Microparticles were only press-bonded or fused, but failed to form into a film.

Evaluation of Powder Handleability of Particles

Based on handleability when the weight of porous PPS microparticles are measured, and handleability when microparticles are sandwiched between polyimide films in the above-mentioned evaluation of film moldability, powder handleability of porous PPS microparticles was evaluated as follows:

A: Microparticles are excellent in fluidity and can be weighed without causing no problems, and also can be spread over a film.
B: Microparticles are excellent in fluidity and can be weighed without causing no problems, but is inferior in filling property when microparticles are spread over a film.
C: Microparticles exhibit strong adhesion and are difficult to handle during weighing, and are also difficult to spread over a film.

Comprehensive Evaluation of Particles

Based on the results of evaluation of film moldability at the above-mentioned four-grade temperature, and evaluation of powder handleability, comprehensive evaluation of porous PPS microparticles was performed by the following criteria:

A: The number of rating A was 4 or more, and rating C does not exist.
B: The number of rating A was 3 or less, and rating C does not exist.
C: The number of rating A was 1 or more.

Evaluation of Shading Effect of Particles

Using a three-dimensional goniospectrophotometric color measurement system (Model GCMS-4, manufactured by Murakami Color Research Laboratory Co., Ltd.), angle dependency on reflection intensity of particles was measured under the measurement conditions of use of a D65 light source, an incidence angle of 45 degrees, a light receiving angle in a range of −80 degrees to 80 degrees (pitch of 2 degrees), and a tilt angle of 0 degree to obtain a reflection distribution map of particles. Measurement sample was prepared by uniformly applying on an adhesive surface of a transparent adhesive tape to form a single layer of PPS microparticles. Using the below-mentioned equations, an average, standard deviation, and maximum deviation of a reflection intensity were calculated from the measurement results. If the particles exhibit small standard deviation and maximum deviation values of the reflection intensity, it can be said that the particles have no specific reflection in a specific direction and enable scattering of light in multiple directions without depending on an angle, and that the particles exhibit shading effect. The shading effect of porous PPS microparticles produced by our method was evaluated as follows based on the PPS resin powder used as a raw material thereof:

A: Both standard deviation and maximum deviation of a reflection intensity are smaller than those of a raw material powder.

B: One of standard deviation and maximum deviation of a reflection intensity is smaller than that of a raw material powder, but the other one is larger than that of a raw material powder.

C: Both standard deviation and maximum deviation of a reflection intensity are larger than those of a raw material powder.

$$I_m = \left(\sum_{i=1}^{n} I_i\right) / n$$

$$\sigma = \sqrt{\left(\sum_{i=1}^{n} (I_i - I_m)^2\right) / n}$$

$$T_{max} = \frac{(I_{max} - I_m) * 10}{\sigma} + 50$$

where Ii represents a reflection intensity at each angle, n represents the number of measurements (−80 degrees to 80 degrees, pitch of 2 degrees, n=81), Im represents an average of a reflection intensity, σ represents a standard deviation, Imax represents a maximum value of a reflection intensity, and Tmax represents a maximum deviation.

Evaluation of Matte Effect of Particles

PPS microparticles were added to a two-pack urethane-based paint (manufactured by Kansai Paint Co., Ltd., Black, Retan (registered trademark) PG60) in the concentration of 2% by weight, and the thus obtained paint was applied to a plastic plate using an air brush, and then dispersibility of particles in the paint, and the matte effect of the paint were evaluated as follows:

Dispersibility: Five-grade visual evaluation was performed whether particles are dispersed in paint without forming coagulated lumps (5: uniformly dispersed to 1: completely coagulated).

Matte effect: Five-grade visual evaluation of the matte effect of the coated surface was performed as follows (5: extremely excellent to 1: no effect).

Reference Example 1: Preparation of p-PPS

Dehydration Step

In a 70 liter autoclave equipped with a stirrer and a bottom plug, 8.3 kg of 47.5% sodium hydrosulfide, 2.9 kg of 96% sodium hydroxide, 11.5 kg of N-methyl-2-pyrrolidone, 1.9 kg of sodium acetate, and 5.5 kg of deionized water were charged and gradually heated to 245° C. over about 3 hours while passing through nitrogen under a normal pressure, and then 9.8 kg of water and 0.3 kg of N-methyl-2-pyrrolidone were distilled off, followed by cooling the reaction vessel to 200° C. The amount of moisture remained in the system per 1 mol of the alkali metal sulfate was 1.1 mol, including moisture consumed by hydrolysis of N-methyl-2-pyrrolidone. The amount of hydrogen sulfide scattered was 0.02 mol per 1 mol of the charged alkali metal sulfate.

Polymerization Step

Next, 10.4 kg of p-dichlorobenzene and 9.4 kg of N-methyl-2-pyrrolidone were added and the reaction vessel sealed in a nitrogen gas. While stirring at 240 rpm, the temperature was raised from 200° C. to 270° C. at a rate of 0.6° C./minute and the reaction performed at 270° C. for 140 minutes. Thereafter, 2.4 kg of water was pressed while cooling from 270° C. to 250° C. over 15 minutes. After gradually cooling from 250° C. to 220° C. over 75 minutes and quickly cooling to around room temperature, contents were taken out.

Washing and Drying Steps

The thus taken out contents were diluted with about 35 liter of N-methyl-2-pyrrolidone to give a slurry. The slurry thus obtained was stirred at 85° C. for 30 minutes and then filtered through 80 mesh wire netting (opening of 0.175 mm) to obtain a solid material. The solid material thus obtained was diluted with 70 liter of deionized water and stirred at 70° C. for 30 minutes, and then an operation of collecting a solid material by filtration through 80 mesh wire netting was repeated three times in total. The solid material thus obtained was dried in a nitrogen gas flow at 120° C. to obtain a dry PPS powder. The thus obtained PPS had a melting point of 281° C. The thermal weight reduction amount at 300° C. was 0.66%.

Reference Example 2: Preparation of p-/m-PPS Copolymer

Dehydration Step

In a 1 liter autoclave equipped with a stirrer, 118 g of 47% sodium hydrosulfide, 42.4 g of 96% sodium hydroxide, 163 g of N-methyl-2-pyrrolidone, 32.0 g of sodium acetate, and 150 g of deionized water were charged and gradually heated to 225° C. over about 3 hours while passing through nitrogen under a normal pressure, and then 210 g of water and 4 g of N-methyl-2-pyrrolidone were distilled off, followed by cooling of the reaction vessel to 150° C. The amount of hydrogen sulfide scattered was 1.8 mol %.

Polymerization Step

Next, 125 g of p-dichlorobenzene, 22.1 g of m-dichlorobenzene, and 131 g of N-methyl-2-pyrrolidone were added and the reaction vessel sealed in a nitrogen gas. While stirring at 400 rpm, the temperature was raised to 227° C. at a rate of 0.8° C./minute and the temperature raised to 270° C./minute at a rate of 0.6° C./minute, followed by maintaining at 270° C. for 170 minutes. After a lapse of 30 minutes from reaching 270° C., 14.4 g of water was added over 10 minutes, followed by cooling to 180° C. at a rate of 0.4° C./minute and further quick cooling to around room temperature.

Washing and Drying Steps

The contents were taken out and diluted with 0.5 liter of N-methyl-2-pyrrolidone to give a slurry. The slurry thus obtained was stirred at 85° C. for 30 minutes and then filtered through 80 mesh wire netting (opening of 0.175 mm) to obtain a solid material. The solid material thus obtained was diluted with 1 liter of deionized water and stirred at 70° C. for 30 minutes, and then an operation of collecting a solid material by filtration through 80 mesh wire netting was repeated three times in total. The solid material thus obtained was dried in a nitrogen gas flow at 120° C. to obtain a dry PPS powder. The thus obtained PPS had a melting point of 239° C. The thermal weight reduction amount at 300° C. was 0.58%.

Example 1

In a 1 liter autoclave, 5 parts by mass of PPS (melting point of 239° C.) obtained in Reference Example 2 as the PPS resin (A), 15 parts by mass of polyvinyl alcohol (G type 'GOHSENOL (registered trademark)' GM-14 having a weight average molecular weight of 29,000, manufactured by The Nippon Synthetic Chemical Industry Co., Ltd.) as the polymer (B), and 80 parts by mass of N-methyl-2-pyrrolidone as the organic solvent (C) were charged and heated to 250° C. over about 1 hour while stirring at 555 rpm using an impeller as a stirring blade. While maintaining at 250° C., the PPS resin (A) and the polymer (B) were dissolved by stirring for 1 hour. Subsequently, the temperature in the autoclave system was controlled to 210° C. and 100 parts by mass of deionized water as poor solvent (D) added dropwise at a speed of 0.83 part by mass/minute through a liquid supplying pump while stirring at 555 rpm to obtain a suspension. The suspension thus obtained was filtered and washed with 100 parts by mass of deionized water, and then the solid material collected by filtration was vacuum-dried at 80° C. to obtain a white powder of PPS microparticles. The thus obtained PPS microparticles exhibited a linseed oil absorption amount of 126 mL/100 g, a number average particle diameter of 22.4 sphericity of 95%, and a particle diameter distribution index of 1.4. The thus obtained porous PPS microparticles exhibited a melting point of 242° C. and a thermal weight reduction amount at 300° C. of 0.64%. Film moldability and powder handleability of the obtained PPS microparticles are shown in Table 2.

A test to confirm actual formation of an emulsion in the above stirring step at 250° C. was separately performed. The PPS resin (A), the polymer (B), and the organic solvent (C) were charged in a pressure-resistant test tube in each proportion mentioned above, and then dissolved and mixed by heating with stirring at 250° C. to obtain a polymer solution. The polymer solution thus obtained was collected and the form observed using Digital Microscope (manufactured by KEYENCE CORPORATION VHX-100), and thus formation of the emulsion was confirmed.

Example 2

In the same manner as in Example 1, except for using 5 parts by mass of PPS (melting point of 239° C.) obtained in Reference Example 2 as the PPS resin (A), 10 parts by mass of polyvinyl alcohol (G type 'GOHSENOL (registered trademark)' GM-14 having a weight average molecular weight of 29,000, manufactured by The Nippon Synthetic Chemical Industry Co., Ltd.) as the polymer (B), and 85 parts by mass of N-methyl-2-pyrrolidone as the organic solvent (C), microparticles were obtained. The thus obtained PPS microparticles exhibited a linseed oil absorption amount of 70 mL/100 g, a number average particle diameter of 37.0 sphericity of 98%, and a particle diameter distribution index of 1.4. The thus obtained porous PPS microparticles exhibited a melting point of 248° C. and a thermal weight reduction amount at 300° C. of 0.53%. Film moldability and powder handleability of the obtained PPS microparticles are shown in Table 2. In the same manner as in Example 1, formation of the emulsion according to the above composition was separately confirmed by a test using a pressure-resistant test tube.

Example 3

In the same manner as in Example 1, except for using 3 parts by mass of PPS (melting point of 239° C.) obtained in Reference Example 2 as the PPS resin (A), 10 parts by mass of polyvinyl alcohol (G type 'GOHSENOL (registered trademark)' GM-14 having a weight average molecular weight of 29,000, manufactured by The Nippon Synthetic Chemical Industry Co., Ltd.) as the polymer (B), and 87 parts by mass of N-methyl-2-pyrrolidone as the organic solvent (C), microparticles were obtained. The thus obtained PPS microparticles exhibited a linseed oil absorption amount of 90 mL/100 g, a number average particle diameter of 30.3 μm sphericity of 99%, and a particle diameter distribution index of 1.3. The thus obtained porous PPS microparticles exhibited a melting point of 245° C. and a thermal weight reduction amount at 300° C. of 0.66%. Film moldability and powder handleability of the obtained PPS microparticles are shown in Table 2. In the same manner as in Example 1, formation of the emulsion according to the above composition was separately confirmed by a test using a pressure-resistant test tube.

Example 4

In the same manner as in Example 1, except for using 5 parts by mass of PPS (melting point of 239° C.) obtained in Reference Example 2 as the PPS resin (A), 5 parts by mass of polyethylene oxide ('ALKOX (registered trademark)' E-60 having a weight average molecular weight of 600,000, manufactured by Meisei Chemical Works, Ltd.) as the polymer (B), and 90 parts by mass of N-methyl-2-pyrrolidone as the organic solvent (C), microparticles were obtained. The thus obtained PPS microparticles exhibited a linseed oil absorption amount of 80 mL/100 g, a number average particle diameter of 8.1 μm sphericity of 95%, and a particle diameter distribution index of 1.5. The thus obtained porous PPS microparticles exhibited a melting point of 245° C. and a thermal weight reduction amount at 300° C. of 0.72%. Film moldability and powder handleability of the obtained PPS microparticles are shown in Table 2. In the same manner as in Example 1, formation of the emulsion according to the above composition was separately confirmed by a test using a pressure-resistant test tube.

Example 5

In the same manner as in Example 1, except for using 5 parts by mass of PPS (melting point of 239° C.) obtained in Reference Example 2 as the PPS resin (A), 5 parts by mass of polyvinyl alcohol (G type 'GOHSENOL (registered trademark)' GM-14 having a weight average molecular weight of 29,000, manufactured by The Nippon Synthetic Chemical Industry Co., Ltd.) as the polymer (B), 90 parts by mass of N-methyl-2-pyrrolidone as the organic solvent (C), and 82 parts by mass of deionized water as the poor solvent (D), and adjusting the temperature Tp at the time of adding the poor solvent dropwise at 230° C., microparticles were obtained. The thus obtained PPS microparticles exhibited a linseed oil absorption amount of 61 mL/100 g, a number average particle diameter of 5.6 μm sphericity of 81%, and a particle diameter distribution index of 3.0. The thus obtained porous PPS microparticles exhibited a melting point of 239° C. and a thermal weight reduction amount at 300° C. of 0.74%. Film moldability and powder handleability of the obtained PPS microparticles are shown in Table 2. In the same manner as in Example 1, formation of the emulsion according to the above composition was separately confirmed by a test using a pressure-resistant test tube.

Example 6

In the same manner as in Example 1, except for using 5 parts by mass of PPS (melting point of 239° C.) obtained in Reference Example 2 as the PPS resin (A), 10 parts by mass of polyethylene oxide ('ALKOX (registered trademark)' E-30 having a weight average molecular weight of 400,000, manufactured by Meisei Chemical Works, Ltd.) as the polymer (B), and 85 parts by mass of N-methyl-2-pyrrolidone as the organic solvent (C), microparticles were obtained. The thus obtained PPS microparticles exhibited a linseed oil absorption amount of 60 mL/100 g, a number average particle diameter of 8.7 μm sphericity of 92%, and a particle diameter distribution index of 3.2. The thus obtained porous PPS microparticles exhibited a melting point of 244° C. and a thermal weight reduction amount at 300° C. of 0.45%. Film moldability and powder handleability of the obtained PPS microparticles are shown in Table 2. In the same manner as in Example 1, formation of the emulsion according to the above composition was separately confirmed by a test using a pressure-resistant test tube.

Example 7

In the same manner as in Example 1, except for using 5 parts by mass of PPS (melting point of 281° C.) obtained in Reference Example 1 as the PPS resin (A), 5 parts by mass of polyethylene oxide ('ALKOX (registered trademark)' E-60 having a weight average molecular weight of 600,000, manufactured by Meisei Chemical Works, Ltd.) as the polymer (B), and 90 parts by mass of N-methyl-2-pyrrolidone as the organic solvent (C), microparticles were obtained. The thus obtained PPS microparticles exhibited a linseed oil absorption amount of 128 mL/100 g, a number average particle diameter of 77.0 sphericity of 71%, and a particle diameter distribution index of 1.7. The thus obtained porous PPS microparticles exhibited a melting point of 280° C. and a thermal weight reduction amount at 300° C. of 0.62%. Film moldability and powder handleability of the obtained PPS microparticles are shown in Table 2. In the same manner as in Example 1, formation of the emulsion according to the above composition was separately confirmed by a test using a pressure-resistant test tube.

Comparative Example 1

Regarding the PPS powder (melting point of 281° C.) obtained in Reference Example 1, a linseed oil absorption amount, a number average particle diameter, sphericity, and a particle diameter distribution index were measured. As a result, the linseed oil absorption amount was 36 mL/100 g, the number average particle diameter was 119.2 μm, the sphericity was 64%, and the particle diameter distribution index was 4.4. Film moldability and powder handleability of the PPS powder obtained in Reference Example 1 are shown in Table 2.

Comparative Example 2

Regarding the PPS powder (melting point of 239° C.) obtained in Reference Example 2, a linseed oil absorption amount, a number average particle diameter, sphericity, and a particle diameter distribution index were measured. As a result, the linseed oil absorption amount was 27 mL/100 g, the number average particle diameter was 259.9 μm the sphericity was 60%, and the particle diameter distribution index was 4.8. Film moldability and powder handleability of the PPS powder obtained in Reference Example 2 are shown in Table 2.

Regarding porous PPS microparticles obtained in Example 1 and Example 6, the shading effect performance of particles, dispersibility in paint, and matte effect when added to paint were evaluated. The respective evaluation results are shown in Table 3. Regarding the Comparative Example 2 PPS powder obtained in Reference Example 2 as a Comparative Example, the same evaluation was carried out. Our porous PPS microparticles had a shading effect to suppress refection of light due to the porous form, and uniformly exhibited the shading effect at a wide range of an angle without depending on the angle, and also exhibited satisfactory dispersibility in paint and exhibited excellent paint matte effect.

TABLE 1

|  | Raw PPS resin Melting point (° C.) | Td-Tp (° C.) | PPS particles Melting point (° C.) | Linseed oil absorption amount (ml/100 g) | Number average particle diameter (μm) | Sphericity (%) | Particle diameter distribution index (—) |
|---|---|---|---|---|---|---|---|
| Example 1 | 239 | 40 | 242 | 126 | 22.4 | 95 | 1.4 |
| Example 2 | 239 | 40 | 248 | 70 | 37.0 | 98 | 1.4 |
| Example 3 | 239 | 40 | 245 | 90 | 30.3 | 99 | 1.3 |
| Example 4 | 239 | 40 | 245 | 80 | 8.1 | 95 | 1.5 |
| Example 5 | 239 | 20 | 239 | 61 | 5.6 | 81 | 3.0 |
| Example 6 | 239 | 40 | 244 | 60 | 8.7 | 92 | 3.2 |
| Example 7 | 281 | 40 | 280 | 128 | 77.0 | 71 | 1.7 |
| Comparative Example 1 | 281 | — | — | 36 | 119.2 | 64 | 4.4 |
| Comparative Example 2 | 239 | — | — | 27 | 259.9 | 60 | 4.8 |

TABLE 2

|  | Film moldability | | | | Powder handleability | Comprehensive evaluation |
|---|---|---|---|---|---|---|
|  | 230° C. 2 min | 250° C. 2 min | 290° C. 2 min | 340° C. 2 min | | |
| Example 1 | B | A | A | A | A | A |
| Example 2 | B | A | A | A | A | A |
| Example 3 | B | A | A | A | A | A |
| Example 4 | B | A | A | A | A | A |
| Example 5 | B | A | A | A | A | A |
| Example 6 | B | A | A | A | B | B |

TABLE 2-continued

|  | Film moldability | | | | Powder handleability | Comprehensive evaluation |
|---|---|---|---|---|---|---|
|  | 230° C. 2 min | 250° C. 2 min | 290° C. 2 min | 340° C. 2 min | | |
| Example 7 | B | B | A | A | B | B |
| Comparative Example 1 | C | C | B | A | C | C |
| Comparative Example 2 | C | B | A | A | C | C |

TABLE 3

| | Reflection intensity | | | Addition to paint | |
|---|---|---|---|---|---|
| | Standard deviation | Maximum deviation | Shading effect | Dispersibility | Matte effect |
| Example 1 | 11.6 | 80.0 | A | 4 | 5 |
| Example 6 | 7.6 | 79.0 | A | 5 | 4 |
| Comparative Example 2 | 15.7 | 81.3 | — | 2 | 2 |

The invention claimed is:

1. Polyphenylene sulfide microparticles having a linseed oil absorption amount of 100 to 1,000 mL/100 g and a number average particle diameter of 1 to 200 μm.

2. The polyphenylene sulfide microparticles according to claim 1, having a sphericity of 80 or more.

3. The polyphenylene sulfide microparticles according to claim 1, having a particle diameter distribution index of 1 to 3.

4. The polyphenylene sulfide microparticles according to claim 1, having a melting point of 210° C. to 270° C.

5. The polyphenylene sulfide microparticles according to claim 1, wherein a polyphenylene sulfide resin is a copolymer of a p-phenylene sulfide unit, and an m-phenylene sulfide unit and/or an o-phenylene sulfide unit, and includes the m-phenylene sulfide unit and/or the o-phenylene sulfide unit in a proportion of 3 to 30% by mass based on the total phenylene sulfide units.

* * * * *